(12) United States Patent
Secker-Walker et al.

(10) Patent No.: US 9,093,061 B1
(45) Date of Patent: Jul. 28, 2015

(54) SPEECH RECOGNITION WITH HIERARCHICAL NETWORKS

(75) Inventors: Hugh Secker-Walker, Newburyport, MA (US); Kenneth J. Basye, Sutton, MA (US); Mahesh Krishnamoorthy, Melrose, MA (US)

(73) Assignee: Canyon IP Holdings, LLC., Wilmington, DE (US)

( * ) Notice: Subject to any disclaimer, the term of this patent is extended or adjusted under 35 U.S.C. 154(b) by 502 days.

(21) Appl. No.: 13/434,315

(22) Filed: Mar. 29, 2012

Related U.S. Application Data

(60) Provisional application No. 61/475,612, filed on Apr. 14, 2011.

(51) Int. Cl.
*G10L 15/14* (2006.01)
*G10L 15/00* (2013.01)
*G10L 15/06* (2013.01)

(52) U.S. Cl.
CPC .............. *G10L 15/00* (2013.01); *G10L 15/063* (2013.01); *G10L 15/142* (2013.01)

(58) Field of Classification Search
CPC ..... G10L 15/063; G10L 15/142; G10L 15/08; G10L 15/02; G10L 15/197; G10L 15/144; G10L 15/183; G10L 15/18
USPC ......... 704/231, 251, 256, 240, 254, 257, 243, 704/256.2, 232, 200.1
See application file for complete search history.

(56) References Cited

U.S. PATENT DOCUMENTS

| | | | |
|---|---|---|---|
| 5,822,730 A | 10/1998 | Roth et al. | |
| 6,571,210 B2* | 5/2003 | Hon et al. | 704/251 |
| 6,980,954 B1* | 12/2005 | Zhao et al. | 704/251 |
| 7,181,398 B2* | 2/2007 | Thong et al. | 704/254 |
| 7,225,125 B2 | 5/2007 | Bennett et al. | |
| 7,379,870 B1* | 5/2008 | Belvin et al. | 704/255 |
| 7,418,387 B2* | 8/2008 | Mowatt et al. | 704/257 |
| 8,311,825 B2 | 11/2012 | Chen | |
| 8,417,530 B1 | 4/2013 | Hayes | |
| 8,589,164 B1 | 11/2013 | Mengibar et al. | |
| 8,670,977 B2* | 3/2014 | Saraclar et al. | 704/9 |

(Continued)

OTHER PUBLICATIONS

Soltau et al., "Dynamic Network Decoding revisited", Automatic Speech Recognition and Understanding, 2009, IEEE Workshop, pp. 276-281.

(Continued)

*Primary Examiner* — Vijay B Chawan
(74) *Attorney, Agent, or Firm* — Knobbe, Martens, Olson & Bear, LLP

(57) ABSTRACT

Provided are systems and methods for using hierarchical networks for recognition, such as speech recognition. Conventional automatic recognition systems may not be both efficient and flexible. Recognition systems are disclosed that may achieve efficiency and flexibility by employing hierarchical networks, prefix consolidation of networks, and future consolidation of networks. The disclosed networks may be associated with a network model and the associated network model may be modified during recognition to achieve greater flexibility.

28 Claims, 8 Drawing Sheets

(56) References Cited

U.S. PATENT DOCUMENTS

| | | |
|---|---|---|
| 2003/0187643 A1* | 10/2003 | Van Thong et al. ............ 704/254 |
| 2003/0191639 A1* | 10/2003 | Mazza .......................... 704/231 |
| 2003/0200086 A1* | 10/2003 | Kawazoe et al. ............. 704/239 |
| 2003/0220792 A1 | 11/2003 | Kobayashi et al. |
| 2005/0149326 A1* | 7/2005 | Hogengout et al. .......... 704/242 |
| 2006/0111907 A1* | 5/2006 | Mowatt et al. ................ 704/257 |
| 2007/0038451 A1 | 2/2007 | Cogne et al. |
| 2007/0150275 A1 | 6/2007 | Garner et al. |
| 2008/0052075 A1 | 2/2008 | He et al. |
| 2008/0147404 A1* | 6/2008 | Liu et al. .................... 704/256.2 |
| 2008/0154870 A1 | 6/2008 | Evermann et al. |
| 2008/0201139 A1* | 8/2008 | Yu et al. ........................ 704/231 |
| 2009/0063151 A1 | 3/2009 | Arrowood et al. |
| 2009/0157401 A1 | 6/2009 | Bennett |

OTHER PUBLICATIONS

Hori et al., "Efficient WFST-Based One-Pass Decoding With On-The-Fly Hypothesis Rescoring in Extremely Large Vocabulary Continuous Speech Recognition", IEEE Transactions on Audio, Speech, and Language Processing, vol. 15, No. 4, May 2007, pp. 1352-1365.

Allauzen et al.,"A Generalized Composition Algorithm for Weighted Finite-State Transducers", Interspeech, Brighton, U.K., Sep. 2009, pp. 1203-1206.

Schalkwyk et al., "Speech Recognition with Dynamic Grammars Using Finite-State Transducers", Eurospeech 2003—Geneva, pp. 1969-1972.

* cited by examiner

SPEECH RECOGNITION WITH HIERARCHICAL NETWORKS

CROSS-REFERENCE TO RELATED APPLICATIONS

This application claims the benefit of priority under 35 U.S.C. §119(e) to U.S. provisional patent application Ser. No. 61/475,612, filed Apr. 14, 2011, which is incorporated herein by reference in its entirety.

FIELD

The invention relates to performing speech recognition and other tasks, such as natural language processing, using hierarchical networks.

BACKGROUND

Automatic speech recognition ("ASR") systems convert speech into text. As used herein, the term "speech recognition" refers to the process of converting a speech (audio) signal to a sequence of words or a representation thereof (text). Speech recognition applications that have emerged over the last few years include voice dialing (e.g., "Call home"), call routing (e.g., "I would like to make a collect call"), simple data entry (e.g., entering a credit card number), preparation of structured documents (e.g., a radiology report), and content-based spoken audio searching (e.g. finding a podcast where particular words were spoken).

In converting audio to text, ASR systems may employ models, such as an acoustic model and a language model. The acoustic model may be used to convert speech into a sequence of phonemes most likely spoken by a user. A language model may be used to find the words that most likely correspond to the phonemes. In some applications, the acoustic model and language model may be used together to transcribe speech.

An ASR system may employ an ASR engine to recognize speech. The ASR engine may perform a search among the possible utterances that may be spoken by using models, such as an acoustic model and a language model. In performing the search, the ASR engine may limit its search to some subset of all the possible utterances that may be spoken to reduce the amount of time needed to perform the speech recognition.

Early ASR systems were limited in that they had a small vocabulary, could recognize of only discrete words, were slow, and were less accurate. For example, early ASR systems may recognize only digits or require the user to pause between speaking each word. As technology progressed, ASR systems were developed that are described as large-vocabulary, continuous speech recognition or LVCSR. LVCSR systems provided improvements over the early systems, including larger vocabularies, the ability to recognize continuous speech, faster recognition, and better accuracy. For example, LVCSR systems may allow for applications such as the dictation of documents. As the technology has improved and as computers have become more powerful, LVCSR systems have been able to handle larger and larger vocabularies and increase accuracy and speed.

As LVCSR systems increase in size, the ASR engine performing the search may have a more complicated task and may require a significant amount of computing resources and time to perform the search. The design of an ASR engine may allow for the search to be more computationally efficient and be more accurate.

DETAILED DESCRIPTION

There is a need to have ASR engines that are both efficient and flexible. An efficient ASR engine may recognize speech more quickly, which may be desirable in some applications, or may be able to provide greater accuracy in the same amount of time. A flexible ASR engine may be adaptable to different ASR tasks, such as providing ASR for general dictation versus medical dictation or such as providing ASR for different languages or accents.

Prior art ASR engines may not able to provide the goals of being both efficient and flexible. Some prior art ASR engines may be based on dynamic word result networks. These ASR engines may provide some flexibility since the word result networks may be created dynamically during recognition. Prior art ASR engines based on dynamic word result networks may not be efficient, however, because they may perform the same computation numerous times in different parts of the word result network.

Some prior art ASR engines may be based on finite-state transducers (FSTs). These ASR engines may provide greater efficiency as the underlying FST may be determinized and/or minimized to avoid redundant computations. Prior art ASR engines based on FSTs, however, may not be flexible since the FST may need to be computed in advance, which may be a computationally intensive task.

Applicants have appreciated that prior art ASR engines may not be able to achieve the goals of efficiency and flexibility. Applicants have recognized that the goals of efficiency and flexibility may be obtained by using a hierarchy of networks. In some embodiments, hierarchical networks may provide efficient computations by consolidating parts of a result network that perform the same or similar computations. In some embodiments, greater flexibility may be realized by using a network model that may be modified or replaced during recognition.

Figure 1:
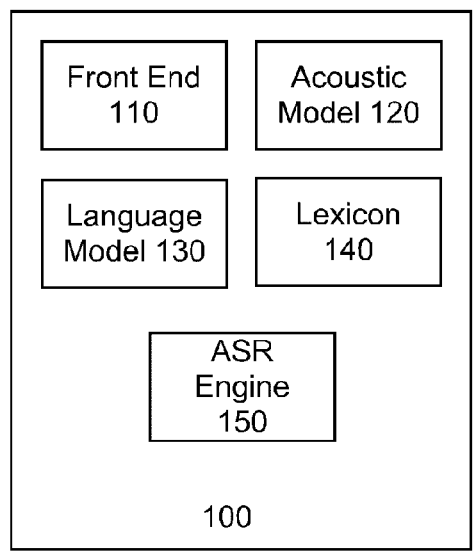
FIG. 1 is a block diagram illustrating components of some speech recognition engines.

FIG. 1 shows an example of ASR system 100. ASR system 100 may be implemented hardware or software using techniques known to one of skill in the art. For example, ASR system 100 may be an embedded system that is installed on a mobile device or in a car, may be implemented on a general purpose personal computer, or may be implemented on a server computer where requests to perform ASR are sent over a network, such as the Internet, and transcriptions are returned over a network.

FIG. 1 shows components that may appear in ASR system 100, including a front end 110 that may receive a spoken utterance and convert the utterance into features; an acoustic model 120 that may model the sounds in speech; a language model 130 that may model how words are spoken; a lexicon 140 that may contain the words that the ASR system is able to recognize; and ASR engine 150 that may use the other components to recognize the words in an utterance.

Front end 110 may receive an audio waveform that contains speech, and the audio waveform may be in any suitable format, such as a PCM encoded way file. Front end 110 may use techniques known to one of skill in the art to convert the audio waveform into features that can be used by other components of ASR system 100. For example, front end 110 may create feature vectors consisting of cepstra, apply first and second derivatives, and apply a linear discriminant analysis transform.

Acoustic model 120 may model the sounds produced in speech, which may be referred to as speech units. Speech units may be phonemes, syllables, or any other appropriate speech unit. For example, if a person says "hello," the first phoneme may be denoted as "H" as, or the first syllable may be denoted as "hel." Acoustic model 120 may be based on any techniques known to one of skill in the art, including hidden Markov models, Gaussian mixture models, vocal tract length normalization, and discriminative training.

Language model 130 may model the likelihood of the order of words in spoken speech. For example, the word "hello" may be more likely at the beginning of an utterance and the word "bye" may be more likely at the end of an utterance. Language model 130 may also indicate likely sequences of words. For example, given the word "laptop," the next word may be more likely to be "computer" than "alligator." Language model 130 may be based on any techniques known to one of skill in the art, including probabilities of bigrams, trigrams, or more generally n-grams of the occurrence of words. Other types of language models known to one of ordinary skill in the art include a structured language model and a maximum entropy language model. Language models may be adapted to particular applications. For example, a language model for medical transcription may contain medical terms that may not appear in a language model for legal dictation. By adapting a language model to a particular application, the accuracy of ASR system 100 may be improved.

Lexicon 140 may include a list of words that are known to ASR system 100. Lexicon 140 may be a specific lexicon, e.g., for medical dictation, or may be a general purpose lexicon. Lexicon 140 may include pronunciations of words using phonemes, syllables or any other speech unit. Lexicon 140 may contain a list of word pronunciations, may include pronunciations stored as a prefix tree, may include pronunciations stored as a graph, or may use any other suitable format known to one of skill in the art.

ASR engine 150 may use the other components to perform speech recognition. ASR engine 150 may use techniques known to one of skill in the art such as dynamic programming to search among the possible alternatives to find a good textual or other speech-recognition result.

Additional background information on ASR systems may be found in L. R. Rabiner and B. H. Juang, *Fundamentals of Speech Recognition*, Prentice-Hall, Englewood Cliff, N.J., 1993; F. Jelinek, *Statistical Methods for Speech Recognition*, MIT Press, 1997; X. Huang, A. Acero, H. W. Hon, *Spoken Language Processing*, Prentice Hall, 2001; D. Jurafsky and J. Martin, *Speech and Language Processing*, (2nd edition), Prentice Hall, 2008; and M. Gales and S. Young, *The Application of Hidden Markov Models in Speech Recognition*, Now Publishers Inc., 2008; which are incorporated herein by reference in their entirety. Further information may also be found in commonly-owned, U.S. patent application Ser. No. 13/221,895, titled "Methods and Systems for Obtaining Language Models for Transcribing Communications" and filed Aug. 30, 2011, and U.S. patent application Ser. No. 13/221, 897, titled "Methods and Systems for Obtaining Language Models for Transcribing Communications" and filed Aug. 30, 2011; each of which is hereby incorporated by reference in its entirety.

ASR systems may receive spoken audio and recognize the words spoken by a user. In performing this recognition, ASR systems may decompose spoken words into smaller units. Some ASR systems may decompose words into speech units, such as phonemes or phones. Some ASR systems may use phones in context, such as triphones or quinphones. For example, the word "hello" may be represented by the phones "H", "E", "L", and "O". This word may also be represented by the sequence of triphones "#-H-E", "H-E-L", "E-L-O", and "L-O-#", where each triphone contains a triple representing the previous phone (or a token such as "#" that indicates there was no previous phone), the current phone, and the next phone (or a token that indicates there is no next phone). Herein, explanations may refer to triphones, but it is understood by one of skill in the art that other speech units may be used as well, such as syllables or quinphones.

Each triphone may be broken down into a sequence of states. One method of modeling triphones is to use hidden Markov models (HMMs). An HMM may consist of a sequence of states with transitions between the states. For example, a triphone may consist of three states, and there may be transitions from each state to the next state and there may also be transitions between other states, such as from the first state to the third state. Each transition may be associated with a cost, such as a probability.

Using the above procedure for decomposing words into states may create a very large number of states. For example, if a language has 40 phones, there may be as many as 40×40× 40=64,000 triphones and if each triphone has three states, there may be as many as 192,000 states. To reduce the total number of states, ASR systems may perform state-tying to reduce the total number of states to a number such as 5000. State tying may be performed in numerous ways known to one of ordinary skill in the art, including but not limited to merging states that are similar to one another. HMMs may thus be sequences of tied states or sequences of untied states.

ASR engines may apply different techniques in using the components of FIG. 1 to perform speech recognition. Examples of techniques used by ASR engines to perform speech recognition are shown in FIG. 2 and FIG. 3.

Figure 2:
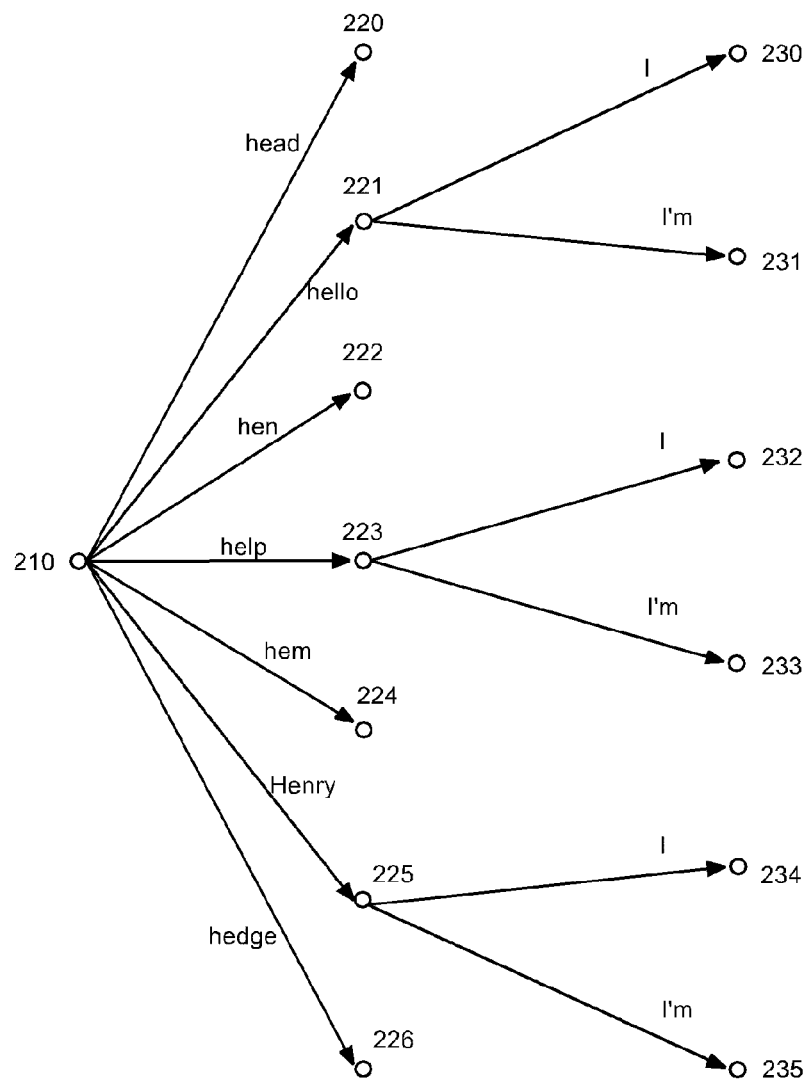
FIG. 2 illustrates an example of a word network used with some speech recognition engines.
Figure 3:
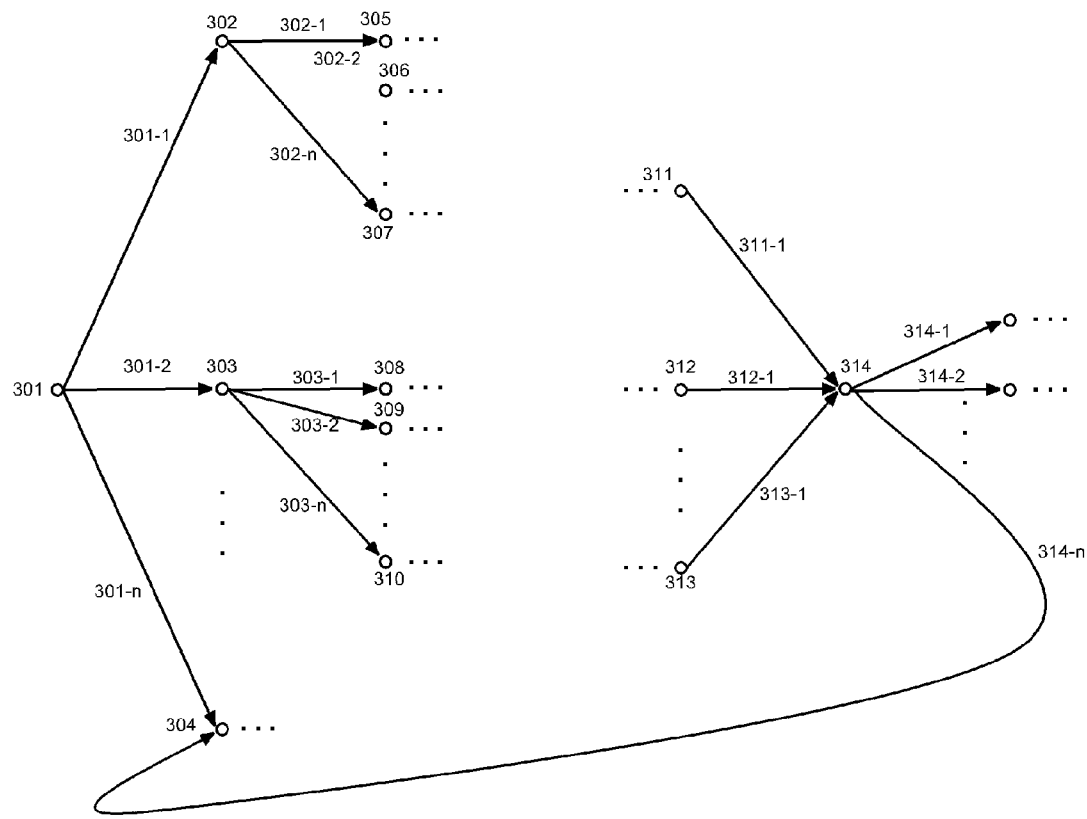
FIG. 3 illustrates an example of a finite-state transducer used with some speech recognition engines.

FIG. 2 shows an example of a word result network that may be used by an ASR engine for recognizing speech. A word result network may consist of sequences of words that may be recognized and the likelihood of each sequence. The likelihood of any path in the word result network may be determined by an acoustic model and a language model. In FIG. 2, the paths shown include, for example, "head", "hello I", "hello I'm", "hen", "help I", "help I'm", "hem", "Henry I", "Henry I'm", and "hedge".

In FIG. 2, word result network may start at initial node 210. At node 210, no words may have been recognized, and the ASR engine may receive input data, such as feature vectors, to start recognizing words. From node 210, the ASR engine may create arcs and additional nodes where each arc may be associated with a word that may be recognized. In some applications, words may be represented by nodes instead of arcs. In FIG. 2, arcs from node 210 to nodes 220 to 226 are labeled with example words that may be recognized by the ASR engine.

Where the ASR engine is being applied to general dictation, the number of arcs from node 210 could be very large, as there may be an arc for every word in the lexicon. In some implementations of ASR engines, techniques such as fast-match or lookahead may be applied to limit the number of arcs and nodes that may be created. With lookahead, it may be determined that the utterance most likely starts with certain phonemes. For example, if it may be determined that the utterance likely starts with the phoneme "H", then the arcs leaving node 210 could be limited to those words that start with the phoneme "H", as shown in FIG. 2.

Where the ASR engine is being applied to recognize a specific type of utterance, such as a date, the number of arcs from node 210 may be smaller since there may be fewer words that could start a date. In these applications, techniques, such as fast-match or lookahead, may not be used.

From initial node 210, the ASR engine may apply acoustic and language models to determine which of the arcs leaving node 210 are most likely to occur. For an acoustic model employing HMMs, ASR engine may create a separate HMM for each arc leaving node 210. Applying the acoustic and language models the ASR engine may decide to pursue some subset of the arcs leaving node 210. For example, in FIG. 2, the ASR engine may decide to follow the paths starting with "hello", "help", and "Henry" and may decide to stop pursuing the paths starting with "head", "hen", and "hedge".

For each path the ASR engine decides to pursue, additional words may be added to the word result network. For example, at node 221, the ASR engine may add the words "I" and "I'm" as possible next words. For each path that continues to be pursued, the ASR engine may apply the acoustic and language model to determine the likelihoods of those paths. For an acoustic model employing HMMs, the ASR engine may create a separate HMM for each new arc. Thus, when the ASR engine reaches nodes 230 to 235, it may have created six different HMM chains, one for each path through the word result network.

Applicants have appreciated that ASR engines applying a word result network as shown in FIG. 2, may not be efficient in that the processing being performed may be redundant. In evaluating the seven paths from node 210 to nodes 220 to 226, the ASR engine may create seven different HMMs. Each word, however, may start with the same phone, and thus each HMM may start with the same state, and the same or similar processing may be performed seven times.

An ASR engine may use a finite state transducer (FST) instead of a word result network. An FST is a graph that may include all possible words that may be recognized by an ASR engine. While the word result network of FIG. 2 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 2. The word result network of FIG. 2 may be built out to include all possible utterances that could be recognized by an engine. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is much smaller than the word result network. An FST may be much smaller because it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example an FST that includes words and phones may be created by composing an FST of words with an FST of phones.

FIG. 3 shows an example of a small piece of an FST that may be used by an ASR engine for recognizing speech. In FIG. 3, the FST may start at initial node 301. From initial node 301, there may be paths through the FST that correspond to sequences that may be recognized. The arcs in the FST may represent a distinct unit of processing. For example, an arc may correspond to an HMM for a particular triphone or may each correspond to a state of an HMM. Because the arcs may correspond to a unit that is smaller than a word, several arcs may need to be traversed before recognizing a word.

From initial node 301, there are n arcs labeled 301-1, 301-2, . . . , 301-n. These arcs may correspond to, for example, HMM states that may start an utterance or to HMMs that may start an utterance. Since the number of HMMs or HMM states that may start an utterance may be much smaller than the number of words in the lexicon, the number of initial arcs in an FST may be much smaller than the number of initial arcs in a word result network and additional steps, such as lookahead, as described above, may not be used. The arcs leaving initial node 301 may be determined. In some applications, each of the n arcs labeled 301-1, 301-2, . . . , 301-n may represent a different unit of processing, such as a different HMM or a different HMM state.

In FIG. 2, there were seven arcs leaving the initial node for seven different words that all started with the same triphone (#-H-EH). Because the seven words start with the same triphone, the recognition of these seven words may all start with the same HMM or HMM state. When these seven words are being considered by a FST as in FIG. 3, the recognition of all seven words may proceed by following a single arc for the triphone (#-H-EH).

Each node of the FST may have multiple inputs and multiple outputs. For example, consider node 314, which has incoming arcs and outgoing arcs. Node 314 may allow transitions between different models represented by the arcs. Where the arcs represent triphone HMMs, arc 311-1 may represent the HMM for triphone X-A-B, arc 312-1 may represent the HMM for triphone Y-A-B, and arc 313-1 may represent the HMM for triphone Z-A-B. At node 314, each of the outgoing arcs may be able to follow each of the incoming arcs. By having the incoming arcs meet at a single node instead of ending at separate nodes, the FST may be more efficient and be able to avoid duplicative computations. At node 314, the outgoing arcs may represent HMMs for triphones that may follow the incoming arcs. Arc 314-1 may represent the HMM for triphone A-B-C, arc 314-2 may represent the triphone for A-B-D, and arc 314-*n* may represent the HMM for triphone A-B-E.

The FST of FIG. 3 may be cyclical. Since a single word, such as "the" may appear in an utterance more than once, the FST may be more efficient if portions of it may be reused. For example, node 314 in FIG. 3 has an arc that goes back to node 304. Node 304 may be the start of a word that appears more than once in an utterance and thus node 304 may be traversed more than once during the transcription of a single utterance.

Applicants have recognized that, although FSTs allow for high-performance speech recognition, the static nature of an FST that may need to be computed in advance limits the flexibility and features of such systems. As described above, an ASR system based on word result networks may offer additional flexibility, but may not be efficient. Applicants have appreciated that the drawbacks of both of these types of ASR systems may be avoided by using an ASR system based on hierarchical networks, as described herein.

In some embodiments of the invention, an ASR system may use a hierarchy of networks. Each network in the hierarchy may include one or more of a result network, a set of network tokens, and a network model. Each network in the hierarchy may or may not be dynamic.

A result network is a structure that may be created during recognition. A result network may be created using input data and may indicate likely sequences of tokens that may be recognized from the data. A result network may be represented in any suitable form and the invention is not limited to any particular structure for a result network. In some embodiments, a result network may be represented by nodes and arcs, and the tokens being recognized may be associated the arcs and/or the nodes. In some embodiments, a result network may be a tree, a lattice, or a directed graph. In some embodiments, the nodes and/or arcs in a result network way have a weight, and the weight may indicate a likelihood or a cost of a path or a portion of a path in a result network.

A network may include a set of network tokens. A set of network tokens may be finite or unbounded. Any appropriate set of network tokens may be used, and the invention is not limited to any particular set of network tokens. In some embodiments, a set of network tokens may be the set of words known to the recognizer, the set of phonemes in the models, or the set of HMMs in the models.

A network may include a network model. A network model may provide information that may be used in building a result network. In some embodiments, a network model may be, for example, a probabilistic model or a grammar. A grammar may include rules that indicate the inputs that may be recognized or accepted by the network. A grammar may include any type of grammar known to one of skill in the art including, for example, a context-free grammar or a regular grammar. A grammar may be expressed in any suitable form including, for example, Backus-Naur form. Any suitable network model may be used, and the invention is not limited to any particular network model.

The process of recognizing speech may involve multiple networks. The following are exemplary networks that may be used with embodiments of the invention, and the invention is not limited to any particular networks.

One network may be a word network. A word network may include a word result network that may be created to indicate sequences of words being recognized. The tokens in a word network may be the words that may be recognized by the system. For a general dictation application, the number of tokens may be very large, but for an application to recognize dates, the number of tokens may be relatively small. A word network may include a word model that provides information concerning allowable sequences of words. A word model may, for example, allow any word to follow any other word, and this word model could be represented by a graph consisting of a single node with self-looping arc for each known word.

Another network may be a language model network. A language model network may include a language model result network that may indicate sequences of words being recognized but may include context to account for the likelihood of particular words appearing in sequence. The tokens in a language model network may be, for example, a word in the context of following a number of other words (e.g., the word "computer" in the context of following the word "laptop"). A language model network may include a language model that may indicate, for example, the probabilities of unigrams, bigrams, and trigrams occurring. In some embodiments, a language model may be represented as a graph where the arcs may indicate the probability of a word appearing in a specified context.

Another network may be a speech unit network. A speech unit network may include a speech unit result network that indicate sequences of speech units, such as triphones, being recognized. A speech unit network may include a set of tokens indicating the speech units known by the ASR system. A speech unit network may include a speech unit model indicating the pronunciations of the words in the ASR system using the tokens. In some embodiments, a word may have more than one pronunciation, and the speech unit model may include different probabilities for each pronunciation of a word. In some embodiments, a speech unit model may be represented as a graph where the arcs may indicate the speech units and a sequence of arcs indicates the pronunciation of a word.

Another network may be a speech-unit-in-context ("SUIC") network. A SUIC network may include a SUIC result network that indicates the sequences of speech units being recognized, but may also include context to account for the variability of speech units depending on the context in which they appear. The tokens in a SUIC network may be the set of speech units in context known to the system. For example, the tokens may be the set of known triphones. The SUIC network may include a SUIC model. In some embodiments, the SUIC model may provide a mapping from a speech unit to a SUIC using the context of the speech unit.

Another network may be an HMM network. A SUIC may be modeled as an HMM comprising a number of states, and there may be a different HMM for each SUIC. An HMM network may include a HMM result network that indicates sequences of HMM states being recognized. An HMM network may include a set of tokens indicating the HMM states known by the ASR system. An HMM result may include an HMM model, indicating the sequences of states in each HMM and which may be represented as a graph.

Another network may be a Gaussian mixture model (GMM) network. Each state of an HMM may consist of a mixture of Gaussian probability densities. A GMM network may include a GMM result network that indicates sequences of GMMs being recognized. A GMM network may include a set of tokens comprising the Gaussian probability densities known to the ASR system. A GMM network may include a GMM model, indicating the likelihood or mixture weights of the Gaussians, and which may be represented as a graph.

The above networks are just examples of possible networks, and any other networks known to a person of skill in the art may be used in addition to or instead of the networks listed above. Some of the above networks may be combined into a single network. For example, the word network and language model network may be combined into a single network.

The above networks may be considered to be in a hierarchy in that one network may be logically above another network. Whether a network is above another network may be determined from the generality of the networks, from the size of the networks, or from other factors. For example, a word network may be considered to be above a speech unit network since a word is larger or more general than a speech unit.

Figure 4:
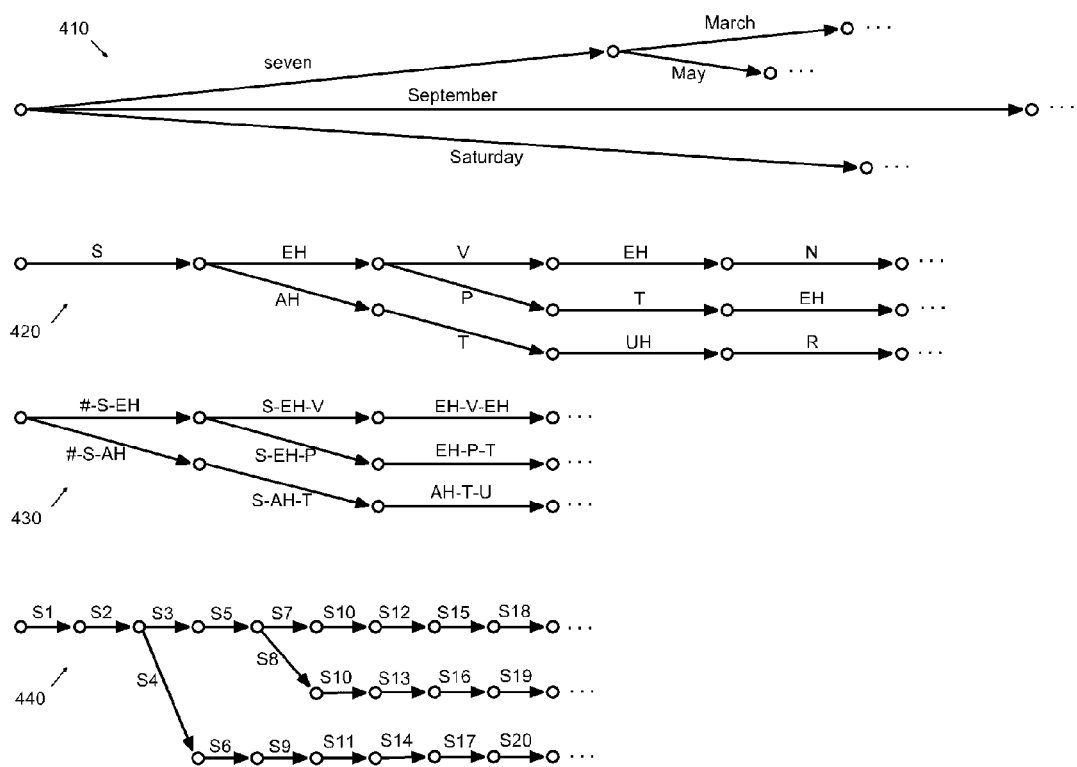
FIG. 4 illustrates an example of a hierarchy of networks that may be used in accordance with some embodiments of the invention.

FIG. 4 shows an example of an embodiment where networks may be used in a hierarchy during speech recognition. The number and types of networks are not a limiting feature and any appropriate network may be used. FIG. 4 shows an example of a word result network 410, a speech unit result network 420, an SUIC result network 430, and an HMM result network 440.

In FIG. 4, word result network 410 shows an example of part of a word result network that may be created during speech recognition. Word result network 410 may be used with a word model for recognizing dates or may be used with a more general word model. Word result network 410 may proceed from left to right where the left-most node indicates the beginning of an utterance. Each arc of word result network 410 may indicate a word that is being recognized and sequences of arcs may indicate the order in which words are being recognized. For example, word result network 410 may be recognizing utterances starting with "seven March", "seven May", "September", and Saturday". In word result network 410, ellipses indicate possible continuations of utterances.

In creating word result network 410, the arcs may be prefix consolidated. For example, utterances may start with "seven March" or "seven May". A word result network may be created with two different arcs for the word "seven" where one of the arcs for "seven" is followed by an arc for "March" and the other arc for the word "seven" is followed by an arc for "May" (not shown). Alternatively, word result network 410 may be prefix consolidated by including only a single arc for the word "seven" as shown in FIG. 4. When extending a node in a result network with additional arcs, one or more arcs from that node may be prefix consolidated where the arcs are associated with the same token. Consolidating arcs may be performed in any manner known to one of skill in the art. For example, a set data structure may be used to determine all of the distinct tokens leaving from a node. After consolidating, all of the arcs may be unique or in some embodiments, some duplicate arcs may remain.

In FIG. 4, speech unit result network 420 may be a result network that is lower than word result network 410 in a hierarchy. Speech unit result network 420 may proceed from left to right where the left-most node indicates the beginning of an utterance. Each arc of speech unit result network 420 may indicate a speech unit (e.g., a phoneme) that is being recognized and sequences of arcs may indicate the order in which speech units are being recognized.

Speech unit result network 420 may be constructed using information from a higher network, such as a word network, and the associated speech unit models. The first set of word tokens from word result network 410—for example, "seven", "September", and "Saturday"—or references to them may be passed to speech unit network. The speech unit model associated with speech unit result network 420 may indicate the pronunciations of the word tokens using speech unit tokens. These speech unit tokens may then be added to speech unit result network 420.

In constructing speech unit result network 420, the arcs may be prefix consolidated. For example, in word result network 410, each of the three initial words of the utterance may start with the same phoneme of "S". Since these three words have the same initial speech unit, only one initial arc may be needed in speech unit result network 420 for the phoneme "S". The arc for the phoneme "S" may be associated with references to the three word tokens from the corresponding word result network 410.

In expanding speech unit result network 420 beyond the initial arc for the phoneme "S", the three references to the word tokens may be used to determine the subsequent phoneme for each of the corresponding words. In the example of FIG. 4, the subsequent phones are "EH", "EH", and "AH", respectively. These arcs may also be prefix consolidated since the words "seven" and "September" have the same second phoneme of "EH". The arc "EH" may be associated with references to the word tokens for "seven" and "September", and the arc "AH" may be associated with a reference to the token for "Saturday".

Speech unit result network 420 may similarly be expanded to the third phones of each of the three initial words in word result network 410. Since the third phonemes of "seven", "September", and "Saturday" are all different from one another, there may be three different arcs for the third phoneme of each utterance, and each of the three arcs may be associated with one of the word tokens.

In expanding a node of speech unit result network 420, it may be determined that speech unit result network 420 has reached the final phoneme of a word. To further expand speech unit result network it may be necessary to determine what words may follow the word that has just ended. For example, where speech unit result network 420 reaches the phone "N" of "seven", the result network may not be able to be further expanded without knowing which words may follow "seven". Where speech unit result network 420 reaches the end of a word token, it may request that a word network provide word tokens for possible subsequent words. For example, word result network 410 may respond that "March" and "May" are words that may follow "seven". The tokens for "March" and "May" along with the pronunciations in the speech unit model may be used to further expand speech unit result network 420 with the corresponding speech unit tokens.

In FIG. 4, SUIC result network 430 may be a result network that is lower than speech unit result network 420 in a hierarchy. SUIC result network 430 may proceed from left to right where the left-most node indicates the beginning of an utterance. Each arc of SUIC result network 430 may represent a SUIC, such as a triphone, that may be recognized and sequences of arcs may indicate the order of SUICs.

SUIC result network 430 may be constructed using information from a higher network, such as a speech unit network, and the associated SUIC models. The first set of speech unit tokens from speech unit result network 420—for example, "S"—or references to them may be passed to SUIC network. The SUIC model associated with SUIC result network 430 may indicate how to construct SUIC tokens using the speech unit tokens. In adding an SUIC token, SUIC result network may need information about the context of the speech unit token. For example, where the SUIC result network is a triphone result network, the SUIC may need information concerning the prior phone and possible subsequent phones to add triphones to the SUIC result network. To obtain necessary context information, SUIC network may request that speech unit network provide tokens indicating possible subsequent speech units. When the context information has been received, the SUIC tokens may then be added to SUIC result network 430.

In creating SUIC result network 430, the arcs may be prefix consolidated, although the consolidation may be different from other result networks. For example, in speech unit result network 420, all of the utterances may start with the same phoneme of "S". Since SUICs may have context, however, there may be more than one initial SUIC even though there may be just a single initial phoneme. The three words "seven", "September", and "Saturday may begin with the triphones, #-S-EH, #-S-EH, and #-S-AH, respectively, and thus two different SUICs may be needed begin SUIC result network 430.

In FIG. 4, HMM result network 440 may be a result network that is lower than SUIC result network 430 in a hierarchy. HMM result network 440 may proceed from left to right where the left-most node indicates the beginning of an utterance. Each arc of HMM result network 440 may represent an HMM state and sequences of arcs may indicate a sequence of HMM states.

HMM result network 440 may be constructed using information from a higher network, such as a SUIC network, and the associated HMM models. The first set of SUIC tokens from SUIC result network 430—for example, "#-S-EH", and "#-S-AH"—or references to them may be passed to HMM result network 440. The HMM models associated with HMM result network 440 may indicate the HMM states of the SUIC tokens. These HMM states may then be added to HMM result network 440.

In creating HMM result network 440, the arcs may be prefix consolidated, although the consolidation may be different from other result networks. As explained above, HMMs may be based on tied states and thus two different SUICs may have the same initial state. For example, the HMM for triphone #-S-EH may consist of states S1, S2, and S3, and the HMM for triphone #-S-AH may consist of states S1, S2, and S4. Since all of the utterances in higher result networks may have S1 as the first HMM state and S2 as the second HMM state, HMM result network 440 may start with only these two states in sequence. Since the third state of the HMM for triphone #-S-EH and for the HMM for triphone #-S-AH may be different (e.g., S3 and S4, respectively), there may be different arcs for the third HMM state as shown in FIG. 4.

In creating the four result networks of FIG. 4, tokens may be added to the result networks in any order. In some embodiments, the word result network 410 could be created first with an initial set of word tokens, and these initial word tokens may be used to add tokens to the speech unit result network 420, the SUIC result network 430, and the HMM result network 440. In some embodiments, the HMM result network may be created first with an initial set of HMM tokens, and these initial HMM state tokens may be used to add tokens to the SUIC result network 430, the speech unit result network 420, and the word result network 410.

Figure 5A:
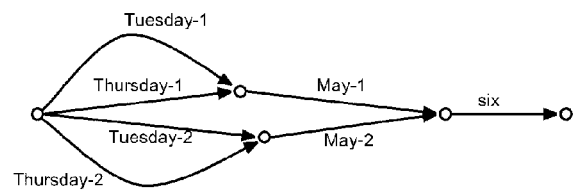
FIG. 5A illustrates an example of a word network with multiple end times in accordance with some embodiments of the invention.

In some embodiments, a single token may be associated with multiple arcs in a result network with different start and/or end times. FIG. 5A shows an example of a word result network where a word token may have multiple start and/or end times in accordance with some embodiments. In FIG. 5A, the word "Tuesday" has two arcs, labeled Tuesday-1 and Tuesday-2, whose end points are displaced indicating different end times. Similarly, the word "Thursday" also has two arcs with different end times. The following word, "May", has two arcs, May-1 and May-2, corresponding to the two start times for the word. Similarly, tokens in other result networks may have multiple start and/or end times.

In FIG. 4, examples of result networks were shown where the result networks were prefix consolidated. In some embodiments, result networks may be consolidated by consolidating futures. The future of a specified arc in a result network is the sub-network of arcs that may follow the specified arc. In some embodiments, it may be possible to determine that the futures of two or more arcs in a result network are identical, and where two or more arcs have identical futures, the arcs may be joined at a single node such that the futures of the two or more arcs are consolidated. Where multiple arcs have common futures, either some or all of those arcs may be joined to consolidate their futures.

Whether two arcs may be future consolidated may depend on the type of result network, the end times of the arcs, and the models associated with the result network or with higher result networks in the hierarchy. In some embodiments, two arcs may be future consolidated only if they have the same end time. In some embodiments, two arcs may be future consolidated as long as their end times are close to one another. Whether end times may be close enough for consolidation may consider the amount of time-overlap of the arcs relative to the difference in ending times. In some embodiments, two arcs may be future consolidated only if the arcs end in a same state of a result network model and the network model has been constructed to enter the same state when arcs have the same future.

The following examples illustrate how future consolidation may take place in several types of networks. The invention is not limited to these particular networks or the illustrative result networks and network models, and future consolidation may be applied to any type of network known to one of skill in the art.

For a word network, a network model may allow any word to follow any other word. Such a network model may be represented as a single node with self-looping arcs associated with each word known to the ASR system. Because there may be only a single state in the model, any two arcs ending at the same time (or times close to one another) may have the same future, and the two arcs may be future consolidated by having the arcs meet at a single node of the word result network.

For a language model network, a network model may consist of n-grams, such as a trigram language model. Such an n-gram language model may be represented as a graph, as is known by one of skill in the art, and an ID may be assigned to each node of the graph. For each arc in the language model result network, the ending node of the arc may be associated with a state of the associated language model. As described above, the ending node of each arc in the language model result network may also have an end time. In some embodiments, two arcs in the language model result network may have a common future if they have the same ending time (or times close to one another) and if the states from the language model associated with the end nodes have the same IDs.

For a speech unit network, a network model may consist of pronunciations of words using a set of speech units. In building a speech unit result network, two speech units, which may each be part of two different words, may have a common future if the remaining speech units in each of the respective words are the same. In some embodiments, to determine whether the remaining speech units in two words are the same, a suffix graph may be used. A suffix graph may consist of inverted trees, where the leaves of the trees represent the initial speech units of words and the root of a tree represents the final speech unit of words. Each state of the suffix graph may have an ID. In a suffix graph, all words that end in the same speech unit may end at the same tree root. All words that end with the same pair of speech units may have the same state for the penultimate speech unit and the same state for the final speech unit, and so forth. Where two speech units are the same and have the same state ID for the corresponding state of the speech unit model, the two speech units may have common futures.

Each arc of a speech unit result network may be associated with a speech unit, and the end node of an arc may have an ending time and may be associated with a state of a speech unit model. Two arcs in a speech unit result network may have a common future if they have the same ending time (or times close to one another) and if the states from the speech unit model associated with the end nodes of the arcs have the same IDs.

For an SUIC network, a network model may consist of a mapping from a speech unit to a SUIC. An ID may be assigned to each SUIC of the model. For each arc in the SUIC result network, the ending node of the arc may be associated with a state of the associated SUIC model and may also have an end time. In some embodiments, two arcs in the SUIC result network may have a common future if they have the same ending time (or times close to one another) and if the states from the SUIC model associated with the end nodes of the arcs have the same IDs.

For an HMM network, a network model may consist of a sequence of HMM states for each HMM in the ASR system. In building an HMM result network, two HMM states, which may each be part of two different HMMs, may have a common future if the remaining HMM states in each of the respective HMMs are the same. In some embodiments, to determine whether the remaining HMM states in two HMMs are the same, a suffix graph may be used, as described above. Where two HMM states are the same and have the same state ID for the corresponding state of the network model, the two HMM states may have common futures.

Each arc of an HMM result network may be associated with an HMM state, and the end node of an arc may have an ending time and may be associated with a state of an HMM model. Two arcs in a HMM result network may have a common future if they have the same ending time (or times close to one another) and if the states from the HMM model associated with the end nodes of the arcs have the same IDs.

For each of the above networks, examples were given where two arcs in a result network may have a common future. In some embodiments, higher networks may also need to be considered in determining whether two arcs have a common future. For two arcs to have a common future, they may need to be associated with the same model IDs for the current result network and may also have to be associated with the same model IDs for some or all of the higher result networks in the hierarchy.

For example, for a speech unit result network, a first speech unit and a second speech unit may have the same ending time (or times close to one another) and the IDs of the associated speech unit models may be the same. The first speech unit may be associated with a first word and the second speech unit may be associated with a second word, and the first word and the second word may or may not be the same word. The network hierarchy may include a language model result network that is above the speech unit result network. The first word and the second word may be associated with different states of the language model. For example, the first word and second word may both be "computer", but the first word may be associated with the context "laptop computer" and the second word may be associated with the context "personal computer". For a trigram language model, the first word and the second word may be associated with different states of the language model and the states may have different probabilities, so the futures of the first word and the second word may be different even though the words are the same. Since the futures of the first word and second word may be different, the futures of the first speech unit and second speech unit may also be different.

To determine whether the corresponding tokens from higher networks have the same model ID, the model ID may be passed with the token when it is sent to a lower network in the hierarchy. For example, in FIG. 4, when the tokens for the words "seven", "September", and "Saturday" are passed from the word network to the speech unit network, the word model ID for each token may be included. Further, when passing the token for the phoneme "S" from the speech unit network to the SUIC network, the corresponding word model IDs and speech unit model ID may be included. In this manner, each network may have the information needed to determine whether two tokens have a common future.

At each network in a network hierarchy, when two tokens have a common future, future consolidation may be applied to reduce the size of a result network. Future consolidation may be applied by joining the respective arcs of the tokens that have a common future to a single node. For example, in FIG. 5A, the arcs Tuesday-1 and Thursday-1 may have a common future and the arcs Tuesday-2 and Thursday-2 may also have a common future. If the futures of the four arcs were not consolidated, then there would be four separate arcs for the word "May", which introduces unnecessary or repetitive computations. By consolidating the arcs with common futures, only two arcs for "May" are necessary.

Figure 5B:
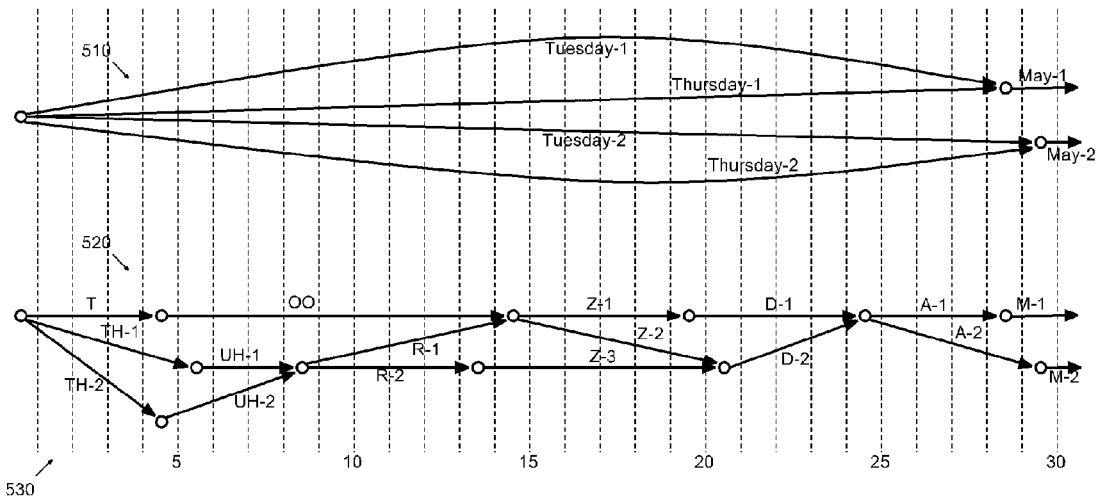
FIG. 5B illustrates an example of a hierarchy of networks with multiple end times in accordance with some embodiments of the invention.

FIG. 5B shows a more detailed example of a portion of the word result network from FIG. 5A and a corresponding speech unit result network in accordance with some embodiments. In FIG. 5B, the dashed vertical lines represent input features 530. As explained above, input features may be feature vectors, such as mel frequency cepstra coefficients, and input features may occur at given time intervals, such as every 10 milliseconds. In FIG. 5B, the number of input features 530 shown is 30.

FIG. 5B shows word result network 510 with four arcs representing the initial words that start at input feature number 1. Two arcs represent the word "Tuesday". The first, labeled "Tuesday-1" ends at input feature number 28, and the second, labeled "Tuesday-2" ends at input feature number 29. Similarly, there are two arcs that represent the word "Thursday", ending at the same two times. The following word, "May," has two arcs with two different start times. The first, labeled, "May-1" starts at input feature 28, and the second, labeled "May-2," starts at feature number 29. Although not shown in FIG. 5A, a word could have both multiple start times and multiple end times. A word may have multiple start and end times in a word result network because the word actually starts or ends between two input features or because of uncertainties in the underlying models. As in FIG. 5A, the arcs for Tuesday-1 and Thursday-1 have been future consolidated and the arcs for Tuesday-2 and Thursday-2 have been future consolidated.

FIG. 5B also shows a speech unit result network 520 corresponding to word result network 510. In speech unit result network 520, the word Tuesday is represented by the five phonemes T, OO, Z, D, and A, and the word Thursday is represented by the six phonemes TH, UH, R, Z, D, and A. Each of the phones may have multiple start times and end times. For example, the phone TH in "Thursday" may end at input feature 5, as represented by arc TH-1, or may end at input feature 4, as represented by arc TH-2. The next phone in "Thursday", UH, may start at input feature 6, as represented by arc UH-1, or may start at input feature 5, as represented by UH-2.

In FIG. 5B, the words "Tuesday" and "Thursday" start with different phones, but each end in the phones Z, D, and A. Because of the common phones at the end of the words, result networks, such as the speech unit, and HMM result networks of FIG. 4 may be future consolidated. FIG. 5B shows an example of a speech unit result network that is future consolidated for the last three phones of "Tuesday" and "Thursday".

In speech unit result network 520, the phone OO of "Tuesday" and the phone R of "Thursday" both have arcs (arc OO and arc R-1, respectively) that end at input feature 14. Since the future of these arcs is the same (phone Z represented by arc Z-1), arc OO and arc R-1 can be consolidated at a single node and their futures can be represented by the same path in the result network. For example, arc OO may be followed by either arc Z-1 or arc Z-2 and arc R-1 may be followed by either arc Z-1 or arc Z-2.

Where the futures of multiple arcs are consolidated, the size of the result network may be reduced. Reducing the size of the result network may increase the speed of an ASR system or may allow a broader search in the same amount of time and thus may increase the accuracy of an ASR system. In consolidating the futures of multiple arcs, the result network may allow the same set of possible paths but with a smaller representation of the result network.

The foregoing networks may be created dynamically during speech recognition. A result network may be created with a set of candidates to start the result network. During recognition, some of the candidates may be eliminated, and some of the candidates may be expanded by adding additional candidates. Selecting the candidates to be eliminated and to be expanded may be done in any suitable manner known to one of skill in the art. In some embodiments, acoustic and language models may be applied with a Viterbi search to keep the most promising paths and stop expanding less promising paths.

Figure 6:
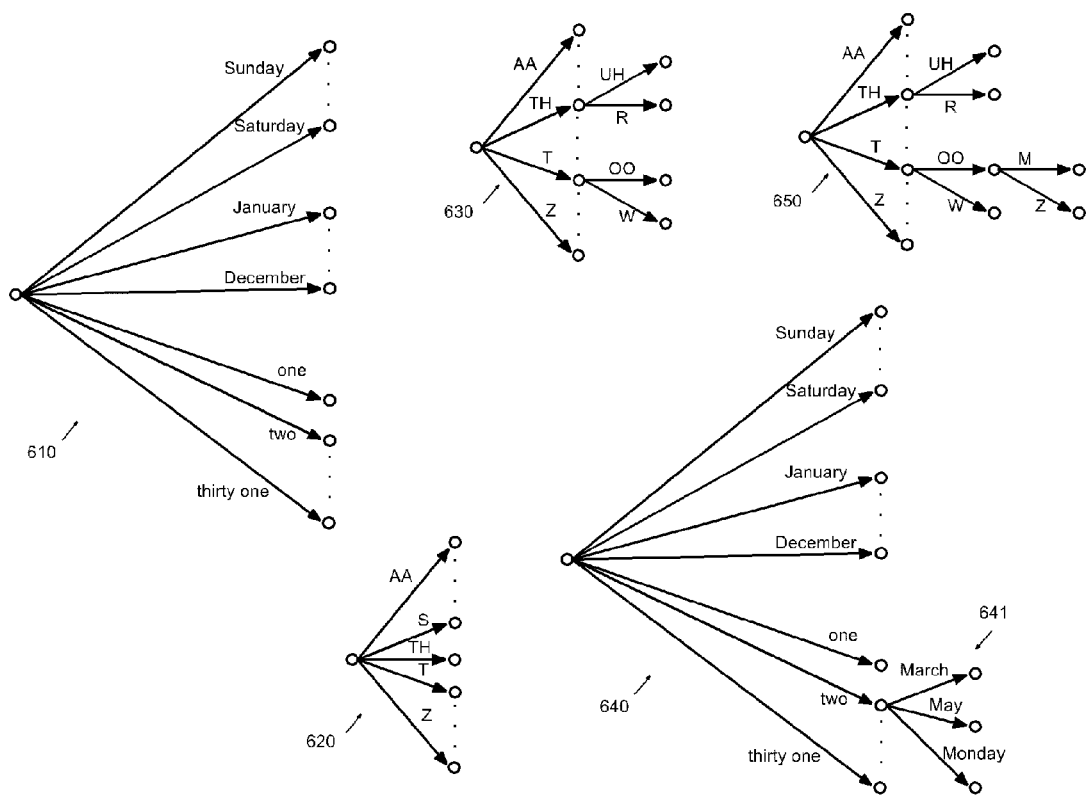
FIG. 6 illustrates an example of dynamically creating of a hierarchy of networks in accordance with some embodiments of the invention.

FIG. 6 illustrates dynamically creating result networks using candidates with an example of a first word result network 610, a first speech unit result network 620, a second speech unit result network 630, and a second word result network 640, and a third speech unit result network 650 in accordance with some embodiments. Any networks known to one of skill in the art, including but not limited to the networks discussed above, may be dynamically created using candidates, and the invention is not limited to the example of FIG. 6.

First word result network 610 may be created with a set of candidates. In some embodiments, the set of candidates may be the set of words that are most likely to start an utterance or all words known to the ASR system. The particular candidates used in a result network is not a limiting feature of the invention and any suitable candidates may be used. For example, if the ASR system is designed to recognize dates, first word result network 610 may include days of the week, months of the year, and numbers. In first word result network 610, the vertical ellipses indicate that the result network includes the intervening items in the sequence, e.g., all days of the week, months of the year, and days in a month. The candidates may be prefix consolidated as described above.

First speech unit result network 620 may be created with a set of candidates. In some embodiments, the candidates may be selected using first word result network 610 and may include phonemes corresponding to words in first word result network 610. In some embodiments, the candidates for the first speech unit result network 620 may include the complete pronunciations of all words in first word result network 610. In some embodiments, the candidates of speech unit result network 620 may include only the initial phonemes for each word in first word result network 610 and subsequent phonemes may be added as needed during recognition.

In FIG. 6, the candidates for first speech unit result network 620 may be prefix consolidated and initially contain the first phoneme for each word in first word result network 610. For example, both "Sunday" and "Saturday" may start with the phoneme S, but the phoneme S may appear as a single candidate in first speech unit result network 620. During recognition, it may be determined that some phonemes in the candidates of first speech unit result network 620 are more likely than others. The likelihood of phonemes may be determined in any suitable method known to one of skill in the art, and the particular method for determining the likelihood of phonemes is not a limiting feature of the invention.

For more likely phonemes, first speech unit result network 620 may be expanded with additional candidates as shown in second speech unit result network 630. For example, if the phones TH and T are more likely than others, then the paths of these phones may be expanded to include candidates for subsequent phones. In some embodiments, the subsequent phones may be determined using information from first word result network 610. For example, the words "Thursday" and "three" both start with the phone TH so to expand the speech unit result network, the arc for phone TH may be expanded to include as candidates the phones UH and R as shown in second speech unit result network 630. Further, the words "Tuesday" and "twenty" both start with the phone T and are followed by the phones OO and W, respectively. The arc for phone T of the first speech unit result network 620 may be expanded to include as candidates the phones OO and W as shown in second speech unit result network 630.

In expanding any arc of a speech unit result network to include additional candidates for subsequent phones, it may be determined that some paths may be future consolidated to reduce the size of the speech unit result network as described above in FIG. 5B. For example, if there are multiple arcs that have the same ending time and have the same future path, then those arcs may be joined to a single node to reduce the size of the expanded network.

When traversing any arc of a speech unit result network, such as first speech unit result network 620 or second speech unit result network 630, that arc may represent the final phone of a word in the corresponding word result network 610, and the word network may be expanded to include additional candidates for subsequent words. Whether a phone in a speech unit network is the final phone of a word in the corresponding word network may be determined by using any methods known to one of skill in the art, and the particular method for doing so is not a limiting feature of the invention. For example, each arc in the speech unit result network may be associated with a reference to the associated word or words may be used to determine whether the phone is the final phone of a word.

In second speech unit result network 630, arc OO is the final phone of the word "two" of first word result network 610. To determine the candidates that may follow arc OO in second speech unit result network 630, first word result network 610 may be expanded by adding words that may follow the word "two". Second word result network 640 shows first word result network 610 with expansion 641 that follows the arc for the word "two". In expanding any arc of a word network to include additional candidates for subsequent phones, it may be determined that some paths may be future consolidated as described above. For example, if there are multiple arcs that have the same ending time and have the same future path, then those arcs may be joined to reduce the size of the network.

Second speech unit result network 630 may be further expanded to third speech unit result network 650 as shown in FIG. 6. In performing this expansion, the words from both first word result network 610 and expansion 641 may be used. For example, in further expanding arc OO in third speech unit result network 650, arc OO may be followed by a candidate arc Z for the word "Tuesday" from first word result network 610. Arc OO may also be followed by the initial phones of the words in expansion 641. For example, expansion 641 may include the words "March", "May", and "Monday", and arc OO of third speech unit result network 650 may also be followed by a candidate arc for the phone M, which is the initial phone of these three words.

This process may continue as described above. The most likely candidates through second speech unit result network 630 may be further expanded with additional candidates. If any of those new candidates correspond to a phone that ends a word in the word network, then the word network may be expanded with additional candidates.

Pruning may be used to limit the size of some or all result networks in a hierarchy. Without pruning, the size of a result network may become prohibitively large, for example, for large vocabulary recognition and long utterances. Since some of the paths in a result network may have much lower likelihoods than other paths in the result network, the lower probability paths may be pruned without significantly impacting accuracy. By pruning result networks, the speed of a speech recognition system may be increased. Any method of pruning known to one of skill in the art may be used, and the specific type of pruning is not a limiting feature.

Pruning may be performed at any network in the hierarchy and may be based on only information present in that network or may also be based on information from other networks in the hierarchy. In some embodiments, a speech unit result network may be pruned based on the likelihood of individual speech units occurring and without considering likelihoods at other result networks in the hierarchy. In some embodiments, a speech unit result network may be pruned based on likelihoods of speech units occurring in combination with likelihood information from other networks, such as a language model network. In some embodiments, a result network may send information relating to pruning, such as likelihood information, to higher or lower networks in the hierarchy, and those other networks may use that information for pruning or further pass the information on to other networks in the hierarchy.

In some embodiments, sets of network candidates may be cached to increase the efficiency of creating or adding to networks. For example, in creating a word network for a new utterance, the ASR system may create the same initial set of network candidates for every utterance to be recognized. By caching this initial set of word candidates, the ASR system may be more efficient. Any method of caching known to one of skill in the art may be used, such as a least-recently-used algorithm for limiting the size of the cache.

In some embodiments, an ASR system using hierarchical networks may be performed efficiently on a multi-core or multi-processor system. The processing for each network of a hierarchy may be assigned to a different core or processor to efficiently perform the computations in parallel since the processing for a network may be independent of other networks.

In some embodiments, the networks may be applied in a different order. For example, a speech unit result network could be created first using candidates corresponding to a specified set of phonemes or all phonemes known to the ASR engine. After it is determined that some of these candidates are more likely than others, a word result network could then be created using information about the more likely candidates. After the word result network is created, the word result network may be used to further expand the speech unit result network.

The above example illustrates the dynamic creation of result networks for a word network and a speech unit network, but the invention is not limited to two networks and is not limited to any particular types of networks. For example, the same procedure could be applied with an HMM network. Any network known to one of skill in the art may be used, and three or more networks may be combined in a hierarchy. At each level of the hierarchy, the result network may be prefix consolidated or future consolidated as described above.

Figure 7:
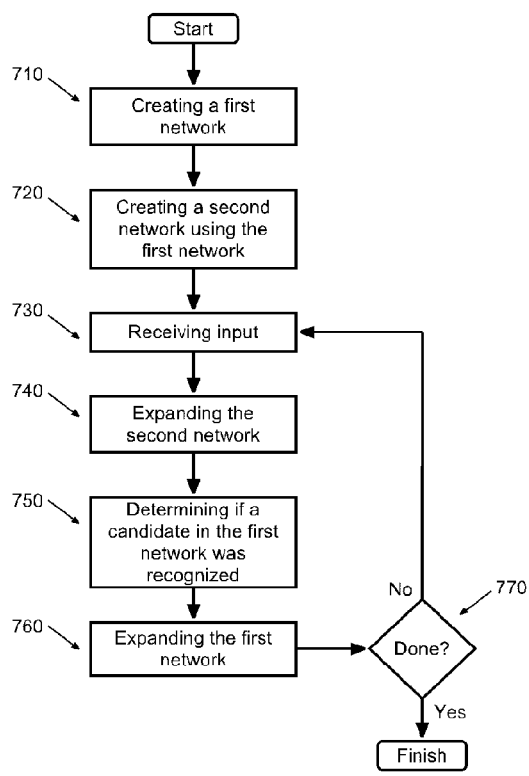
FIG. 7 is a flowchart depicting an example of a process for dynamically creating a hierarchy of networks in accordance with some embodiments of the invention.

FIG. 7 shows an example process for using networks in speech recognition. At act 710, a first result network may be created using a set of tokens associated with the first network. For example, for a word network, the tokens may be the words that may be recognized, and for a speech unit network the tokens may be a list of phonemes. First network may be any of the network types described above or any other network type known to one of skill in the art. The first result network may include a first set of first-level network candidates where each candidate may be one of the tokens associated with the first network. For example, where the first network is a word network, the first set of result network candidates may be all words known by the recognizer or may be a smaller set of words. The first set of first-level result network candidates may be prefix consolidated to reduce the size of the first network. In performing prefix consolidation, duplicate candidates may be merged together, but not all duplicate candidates need to be merged together.

At act 720, a second result network may be created using the first network. The second network may be created using a set of tokens associated with the second network. The second network may be the same type as the first network or may be a different type, and the second network may be higher or lower than the first network in a hierarchy. The second result network may be created based on the first set of first-level network candidates and may include a first set of second-level candidates where each second-level candidate may be one of the tokens associated with the second network. For example, where the first network is a word network and the first set of result network candidates is a set of words, the second network may be a speech unit network and the second-level candidates may be the initial speech units of the words in the first set of result network candidates. The second-level result network candidates may be prefix consolidated to reduce the size of the second network.

At act 730, input is received. The input may be in any suitable form known to one of skill in the art. The input may include any features known to one of skill in the art and may include tokens from either the first network or the second network. The input may be derived directly or indirectly from an input audio file or may be derived directly or indirectly from another network. The input may, but need not be, a token associated with the second network. For example, where the first network is a word network and the second network is a speech unit network, the input may be a token representing a speech unit.

At act 740, the second result network may be expanded with additional candidates. The second result network may be expanded in any suitable way known to one of skill in the art, and may include expanding some or all of the arcs of the second result network. In some embodiments, the arcs in the second result network corresponding to a set of most promising paths may be expanded with a second set of second-level candidates. For example, where the first network is a word network and the second network is a speech unit network, the second result network may be expanded by adding additional arcs corresponding to speech units that are allowed to follow the speech units already present in the second result network. The second set of second-level candidates may be prefix consolidated and/or future consolidated to reduce the size of the network.

At act 750, it may be determined whether a candidate in the first set of first-level candidates was recognized. This may be performed in any suitable way known to one of skill in the art. In some embodiments, each of the second-level candidates may include a reference to the first network that indicates whether the second-level candidate corresponds to the end of a first-level candidate in the first network. For example, where the first network is a word network and the second network is a speech unit network, the second network may include a reference indicating whether a speech unit in the second network corresponds to the final speech unit of a word in the first network.

At act 760, the first result network may be expanded with additional candidates. The first result network may be expanded in any suitable way known to one of skill in the art, and may include expanding some or all of the arcs of the first result network. In some embodiments, the first result network may be expanded with a second set of first-level candidate following the candidate that was recognized at act 750. For example, where the first network is a word network and the second network is a speech unit network, the first result network may be expanded by adding words that may follow the recognized word from act 750. The second set of first-level candidates may be prefix consolidated and/or future consolidated to reduce the size of the network.

At act 770, it may be determined whether there is additional input to be processed. For example, where an audio file is being processed and all of the frames of audio have been processed then there may not be additional input. Where the input is received from another network, the other network may indicate that there is no additional input to be processed. Where there is no additional input, the process may be complete. Where there is additional input, the process may proceed to act 730.

Figure 8:
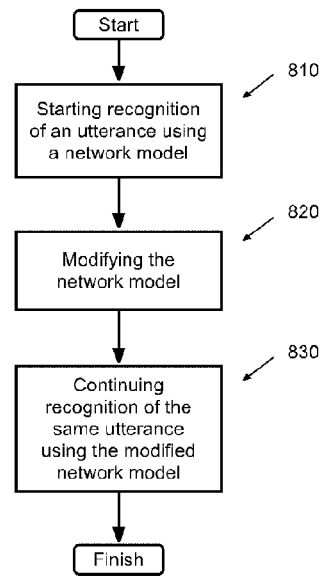
FIG. 8 is a flowchart depicting an example of a process for dynamically modifying a network in accordance with some embodiments of the invention.

FIG. 8 shows an example process for modifying a network model during speech recognition. At act 810, an utterance is being recognized using a network model. The network model may be any suitable network model known to one of skill in the art, including but not limited to the network models described above. For example, the network model may be a language model.

At act 820, the network model is modified. The network model may be modified in any suitable way, and the invention is not limited to any particular way of modifying the network model. For example, the model may be modified be replacing it in its entirety with a new model, the model may be modified through adaptation (such as maximum a posteriori (MAP) adaptation or maximum likelihood linear regression (MLLR) adaptation), and the model may be modified through interpolation (such as interpolating two acoustic models or two language models). In some embodiments, information about the speaker may be used to determine information about words likely to be spoken, and this information may be used to modify a language model. For example, the language model may be modified to include the speaker's name, phone number, and address or to increase the probability of words previously used by the speaker.

At act 830, the recognition of the same utterance from act 810 may continue to be recognized, and the recognition may be performed using the modified network model from act 820. The modified network model may be used only causally, may be used to modify recognition results going back to the beginning of the utterance, or may be used to modify recognition results over some shorter time period. For example, where speech recognition is being performed in real time or close to real time, it may be desired to obtain the speech recognition results as soon as possible and to apply the modified network model only to input that is received after the modifying the network model. Where speech recognition is being performed in a batch mode, and accuracy is more important than speed, the modified network model may be applied to the entire utterance, and the modified network model may be used to modify the existing speech recognition results, such as through a rescoring of a lattice of existing results.

Using a hierarchy of networks that are created, combined, and modified dynamically during speech recognition may have advantages over the prior art.

Using dynamically created networks may allow for greater adaptation and flexibility during speech recognition. For example, a speech recognition engine may use models designed for English with a U.S. accent. Where a speaker is speaking English with a U.K. or Indian accent, the performance of the speech engine may be reduced. Where the accent of a speaker may be determined, models may be applied that have been developed specifically for the speaker's accent. With traditional speech recognition systems, the accent of the speaker may need to be determined in advance, but where dynamic networks are used, the networks may be adapted for the speaker's accent during speech recognition without any interruption in the speech recognition. For example, an ASR engine may start recognizing an utterance using models for U.S. English, it may be determined during recognition that the speaker is speaking British English and not American English, and during the recognition, the speech unit network model may be changed to represent British English to improve the accuracy of the recognition.

Where the identity of a speaker may be determined during speech recognition, the speaker's identity may be used during recognition to enhance the networks being used. Networks may be replaced or adapted based on any suitable criteria such as the speaker's gender, age, or geographic location; other utterances spoken by the speaker; or text written by the speaker. For example, information about the speaker may be obtained from the user's email, social networking sites (e.g., Facebook), Twitter feeds, blogs, and other information. This information could be used to change or adapt any of the networks during speech recognition. For example, the speech unit network model may be changed to reflect how the user speaks, a word network model may be changed to include words known by the speaker (e.g., nicknames of friends or made up words), or a language model may be changed to reflect words commonly used by the user.

The ability to replace or modify default networks may be applied in numerous ways to allow for more accurate speech recognition. For example, speech recognition may have poorer performance in noisy environments. Where the noise-level of the environment may be determined, a Gaussian mixture model network model may be replaced by one that is more robust to noise.

In another example, a speech recognition system may be adapted to the speaking rate of a speaker. Some networks may perform better for fast speakers and other networks may perform better for slow speakers. One example of an adaptation would be for an HMM network where the transition probabilities of the HMM network may be modified and/or the number of states for some or all phonemes may be modified. Where the speaking rate can be determined, the HMM network may be modified during speech recognition to improve performance.

Figure 9:
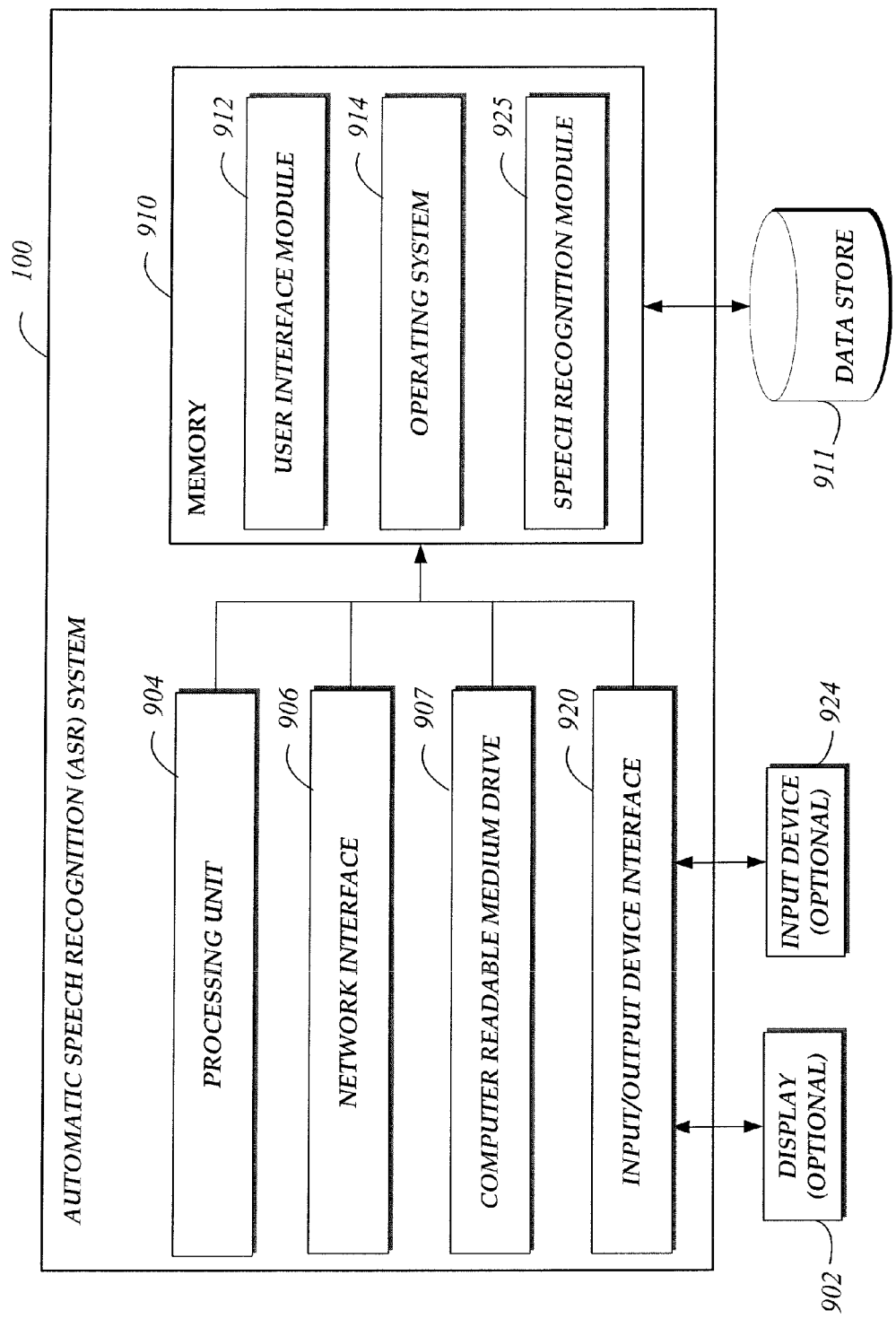
FIG. 9 depicts a general architecture of an automatic speech recognition (ASR) system.

FIG. 9 depicts an example of a general architecture of an automatic speech recognition (ASR) system 100. The general architecture of the ASR system 100 depicted in FIG. 9 includes an arrangement of computer hardware and software components that may be used to implement aspects of the present disclosure. The ASR system 100 may include many more (or fewer) components than those shown in FIG. 9. It is not necessary, however, that all of these generally conventional components be shown in order to provide an enabling disclosure. As illustrated, the ASR system 100 includes a network interface 906, one or more processing units 904, an input/output device interface 920, an optional display 902, an optional input device 924, and a computer readable medium drive 907, all of which may communicate with one another by way of a communication bus. The network interface 906 may provide connectivity to one or more networks or computing systems. The processing unit 904 may thus receive information and instructions from other computing systems or services via a network. The processing unit 904 may also communicate to and from memory 910 and further provide output information for an optional display 902 via the input/output device interface 920. The input/output device interface 920 may also accept input from the optional input device 924, such as a keyboard, mouse, digital pen, etc.

The memory 910 contains computer program instructions that the processing unit 904 executes in order to implement one or more embodiments. The memory 910 generally includes RAM, ROM and/or other persistent or non-transitory computer-readable media. The memory 910 may store an operating system 914 that provides computer program instructions for use by the processing unit 904 in the general administration and operation of the ASR system 100. The memory 910 may further include computer program instructions and other information for implementing aspects of the present disclosure. For example, in one embodiment, the memory 910 includes a user interface module 912 that generates user interfaces (and/or instructions therefor) for display upon a computing device, e.g., via a navigation interface such as a web browser installed on the computing device. In addition, memory 910 may include or communicate with a data store 911.

In addition to the user interface module 912, the memory 910 may include a speech recognition module 925 that may be executed by the processing unit 904. In one embodiment, the speech recognition module 925 implements various aspects of the present disclosure. While the speech recognition module 925 is shown in FIG. 9 as part of the ASR system 100, in other embodiments, all or a portion of a speech recognition module may be on a different server. In addition, fewer, more or all of the components of the ASR system 100 as shown in FIG. 1 may be executed and/or accessed by the processing unit 904.

While the above invention has been set forth in the context of speech recognition, the invention is not limited to speech recognition and may be applied to many other applications including natural language processing, speech synthesis, machine translation, optical character recognition, pattern matching, string processing, machine learning, information extraction, information retrieval, text normalization and pronunciation models. Other fields of application include: learning and recognizing the occurrence of events and anomalies in social network data, recognizing patterns in hierarchies of models based on sequences of biological DNA, recognizing and predicting network congestion, e.g. for vehicular traffic or computer networks, recognizing and predicting player behavior during interactive games, recognizing patterns of diseases in medical records, recognizing and predicting failures of machinery based on sensor data, learning and applying control systems for robots based on sensor data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes, including but not limited to calculation processes, described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for performing speech recognition, comprising:

selecting, via at least one computer processor configured to execute specific instructions, a first set of word candidates from a plurality of word tokens, wherein the plurality of word tokens are associated with a language model and a word network of a hierarchy of networks;

selecting, via the at least one computer processor, a first set of speech unit candidates from a plurality of speech unit tokens, wherein the plurality of speech unit tokens are associated with a speech unit model and a speech unit network of the hierarchy of networks, wherein a word token of the plurality of word tokens corresponds to one or more speech tokens of the plurality of speech tokens;

receiving, via the at least one computer processor, audio input, wherein the audio input was captured via a microphone;

selecting, via the at least one computer processor, a second set of speech unit candidates from the plurality of speech unit tokens using the audio input and the first set of speech unit candidates;

recognizing, via the at least one computer processor, a word candidate in the first set of word candidates based at least partly on a correspondence of the word candidate to one or more speech unit candidates of the second set of speech unit candidates; and selecting, via the at least one computer processor, a second set of word candidates from the plurality of word tokens based at least partly on recognition of the word candidate.

2. The computer-implemented method of claim 1, wherein the plurality of word tokens comprises words of the English language and the language model comprises a trigram language model.

3. The computer-implemented method of claim 1, wherein the plurality of speech unit tokens comprises phonemes and the speech unit model comprises a lexicon indicating the pronunciation of words using the phonemes.

4. A computer-implemented method comprising:
selecting, via at least one computer processor configured to execute specific instructions, a first set of first-level candidates from a plurality of first-level tokens, wherein the plurality of first-level tokens are associated with a first network of a hierarchy of networks;

selecting, via the at least one computer processor, a first set of second-level candidates from a plurality of second-level tokens, wherein the plurality of second-level tokens are associated with a second network of the hierarchy of networks, wherein a first-level token of the plurality of first-level tokens corresponds to one or more second-level tokens of the plurality of second-level tokens;

receiving input via the at least one computer processor, wherein the input was captured via a microphone;

selecting, via the at least one computer processor, a second set of second-level candidates from the plurality of second-level tokens using the input and the first set of second-level candidates;

recognizing, via the at least one computer processor, a candidate in the first set of first-level candidates using the second set of second-level candidates; and selecting, via the at least one computer processor, a second set of first-level candidates from the plurality of first-level tokens using the candidate.

5. The computer-implemented method of claim 4, wherein the plurality of first-level tokens comprises words and the plurality of second-level tokens comprises speech units.

6. The computer-implemented method of claim 4, further comprising:
prefix consolidating the first set of second-level candidates.

7. The computer-implemented method of claim 6, wherein prefix consolidating the first set of second-level candidates comprises merging all duplicates among the first set of second-level candidates.

8. The computer-implemented method of claim 4, wherein the plurality of first-level tokens is associated with a first network model.

9. The computer-implemented method of claim 8, wherein the plurality of first-level tokens comprises speech units in context and the first network model comprises a mapping of speech units to the speech units in context.

10. The computer-implemented method of claim 4, further comprising:
creating a first result network using the first set of first-level candidates; and
creating a second result network using the first set of second-level candidates.

11. The computer-implemented method of claim 10, wherein creating a first result network using the first set of first-level candidates comprises creating a graph with a node and a plurality of arcs leaving the node, wherein each of the plurality of arcs is associated with one candidate from the first set of first-level candidates.

12. A computer readable, non-transitory storage medium storing computer executable instructions that, when executed by one or more computing systems, configure the one or more computer systems to collectively perform operations comprising:
selecting, via at least one computer processor configured to execute specific instructions, a first set of first-level candidates from a plurality of first-level tokens, wherein the plurality of first-level tokens are associated with a first network of a hierarchy of networks;

selecting, via the at least one computer processor, a first set of second-level candidates from a plurality of second-level tokens, wherein the plurality of second-level tokens are associated with a second network of the hierarchy of networks, wherein a first-level token of the plurality of first-level tokens corresponds to one or more second-level tokens of the plurality of second-level tokens;

receiving input via the at least one computer processor, wherein the input was captured via a microphone;

selecting, via the at least one computer processor, a second set of second-level candidates from the plurality of second-level tokens using the input and the first set of second-level candidates;

recognizing, via the at least one computer processor, a candidate in the first set of first-level candidates using the second set of second-level candidates; and selecting, via the at least one computer processor, a second set of first-level candidates from the plurality of first-level tokens using the candidate.

13. The computer readable, non-transitory storage medium of claim 12, the operations further comprising:
selecting a first set of third-level candidates from a plurality of third-level tokens.

14. The computer readable, non-transitory storage medium of claim 12, the operations further comprising:
creating a first result network using the first set of first-level candidates.

15. The computer readable, non-transitory storage medium of claim 14, wherein creating a first result network using the first set of first-level candidates comprises creating a directed graph with a node and a plurality of arcs leaving the node, wherein each of the plurality of arcs is associated with one candidate from the first set of first-level candidates.

16. The computer readable, non-transitory storage medium of claim 12, wherein each candidate of the second set of second-level candidates is associated with a probability.

17. The computer readable, non-transitory storage medium of claim 12, the operations further comprising:
future consolidating the second set of first-level candidates.

18. The computer readable, non-transitory storage medium of claim 12, the operations further comprising:
creating a first result network using the first set of first-level candidates and the second set of first-level candidates, wherein the first result network is a graph and wherein each of the first set of first-level candidates and each of the second set of first-level candidates is associated with an arc of the graph; and
wherein future consolidating the second set of first-level candidates comprises merging a first arc and a second arc that have the same end time and correspond to the same state of an associated first-level model.

19. A system comprising one or more computing devices, the system configured to:
select, via at least one computer processor configured to execute specific instructions, a first set of first-level candidates from a plurality of first-level tokens, wherein the plurality of first-level tokens are associated with a first network of a hierarchy of networks;
select, via the at least one computer processor, a first set of second-level candidates from a plurality of second-level tokens, wherein the plurality of second-level tokens are associated with a second network of the hierarchy of networks, wherein a first-level token of the plurality of first-level tokens corresponds to one or more second-level tokens of the plurality of second-level tokens;
receiving input via the at least one computer processor, wherein the input was captured via a microphone;
select, via the at least one computer processor, a second set of first-level candidates from the plurality of first-level tokens using the input and the first set of second-level candidates;
recognize, via the at least one computer processor, a candidate in the first set of second-level candidates using the second set of first-level candidates; and
select, via the at least one computer processor, a second set of second-level candidates from the plurality of second-level tokens using the candidate.

20. The system of claim 19 further configured to:
prefix consolidate the first set of first-level candidates;
future consolidate the first set of first-level candidates;
prefix consolidate the first set of second-level candidates;
future consolidate the first set of second-level candidates;
prefix consolidate the second set of second-level candidates;
future consolidate the second set of second-level candidates;
prefix consolidate the second set of first-level candidates; and
future consolidate the second set of first-level candidates.

21. The system of claim 19 further configured to:
create a first result network using the first set of first-level candidates; and
create a second result network using the first set of second-level candidates.

22. The system of claim 19, wherein the plurality of first-level tokens comprises phones-in-context and the plurality of second-level tokens comprises hidden Markov model states.

23. The system of claim 19, wherein the plurality of first-level tokens is associated with a first network model, and the plurality of second-level tokens is associated with a second network model.

24. The system of claim 19 further configured to:
select the second set of first-level candidates from the plurality of first-level tokens using the first network model.

25. The computer-implemented method of claim 1, further comprising adding, via the at least one computer processor, at least one speech unit candidate to the speech unit network based at least partly on the second set of word candidates.

26. The computer-implemented method of claim 4, wherein recognizing the candidate in the first set of first-level candidates using the second set of second-level candidates comprises recognizing the candidate based at least partly on a correspondence of the candidate to one or more second-level candidates of the second set of second-level candidates.

27. The computer readable, non-transitory storage medium of claim 12, the operations further comprising adding, via the at least one computer processor, at least one second-level candidate to the second-level network based at least partly on the second set of first-level candidates.

28. The system of claim 19, wherein recognizing the candidate in the first set of first-level candidates using the second set of second-level candidates comprises recognizing the candidate based at least partly on a correspondence of the candidate to one or more second-level candidates of the second set of second-level candidates.

* * * * *

UNITED STATES PATENT AND TRADEMARK OFFICE
CERTIFICATE OF CORRECTION

| | | |
|---|---|---|
| PATENT NO. | : 9,093,061 B1 | Page 1 of 1 |
| APPLICATION NO. | : 13/434315 | |
| DATED | : July 28, 2015 | |
| INVENTOR(S) | : Secker-Walker et al. | |

It is certified that error appears in the above-identified patent and that said Letters Patent is hereby corrected as shown below:

In the claims,

In column 6 at line 17, Change "that that" to --that--.

Signed and Sealed this
Twenty-second Day of March, 2016

Michelle K. Lee
*Director of the United States Patent and Trademark Office*